(12) United States Patent
Yuen et al.

(10) Patent No.: US 11,631,251 B2
(45) Date of Patent: Apr. 18, 2023

(54) METHOD AND SYSTEM FOR JOCKEY AND HORSE RECOGNITION AND TRACKING

(71) Applicant: TFI Digital Media Limited, Hong Kong (HK)

(72) Inventors: Yiu Fai Yuen, Hong Kong (HK); Wing Chuen Cheng, Hong Kong (HK); Ho Ting Lee, Hong Kong (HK); Chi Keung Fong, Hong Kong (HK); Hon Wah Wong, Hong Kong (HK)

(73) Assignee: TFI Digital Media Limited, Hong Kong (HK)

( * ) Notice: Subject to any disclaimer, the term of this patent is extended or adjusted under 35 U.S.C. 154(b) by 236 days.

(21) Appl. No.: 17/182,262

(22) Filed: Feb. 23, 2021

(65) Prior Publication Data

US 2021/0264159 A1    Aug. 26, 2021

(51) Int. Cl.
*G06V 10/25* (2022.01)
*G06V 40/10* (2022.01)
*G06V 20/40* (2022.01)
*G06T 7/73* (2017.01)
*G06N 5/00* (2023.01)
(Continued)

(52) U.S. Cl.
CPC .............. *G06V 20/42* (2022.01); *G06F 17/11* (2013.01); *G06N 5/003* (2013.01); *G06T 7/248* (2017.01); *G06T 7/74* (2017.01); *G06V 10/25* (2022.01); *G06V 20/46* (2022.01); *G06V 40/10* (2022.01); *G06T 2207/30196* (2013.01); *G06T 2207/30221* (2013.01)

(58) Field of Classification Search
None
See application file for complete search history.

(56) References Cited

U.S. PATENT DOCUMENTS

| 2009/0042628 A1* | 2/2009 | Yoda .......................... G06T 7/74 463/6 |
| 2012/0081531 A1 | 4/2012 | DeAngelis et al. |

(Continued)

FOREIGN PATENT DOCUMENTS

| CN | 102449657 A | 5/2012 |
| CN | 107330920 A | 11/2017 |
| WO | 2011116421 A1 | 9/2011 |

OTHER PUBLICATIONS

S. J. Hobbs et al., "Motion analysis and its use in equine practice and research", Wiener Tierarztliche Monatszeitschrift, 2010, vol. 97, pp. 55-64.

(Continued)

*Primary Examiner* — Idowu O Osifade
(74) *Attorney, Agent, or Firm* — Idea Intellectual Limited; Margaret A. Burke; Sam T. Yip (57) ABSTRACT

A method for jockey and horse recognition and tracking. The method includes receiving input images or a sequence of images obtained from horse racing videos or video streams; extracting features from the images by computational methods; locating jockey and horse positions of a target horse in the images by the computational methods; deciding to accept or reject the computed jockey and horse positions according to an acceptance function; and producing the final jockey and horse positions and their associated information by an error correction algorithm.

17 Claims, 4 Drawing Sheets

(51) Int. Cl.
    *G06F 17/11*         (2006.01)
    *G06T 7/246*        (2017.01)

(56) References Cited

U.S. PATENT DOCUMENTS

| | | | |
|---|---|---|---|
| 2013/0235208 A1* | 9/2013 | Hirano | G06T 7/136 |
| | | | 348/157 |
| 2015/0207987 A1* | 7/2015 | Troy | H04N 7/183 |
| | | | 348/142 |
| 2019/0294869 A1* | 9/2019 | Naphade | G06T 7/70 |
| 2020/0098394 A1* | 3/2020 | Levinson | G01S 17/89 |
| 2021/0233326 A1* | 7/2021 | Li | G06T 7/74 |

OTHER PUBLICATIONS

Patricia de Cocq et al., "Performance Monitoring in Equine Sports", Proceedings of Measuring Behavior 2010, pp. 13-15.
Examination report of corresponding Hong Kong patent application No. 22020003184.1 dated Jun. 9, 2022.

* cited by examiner

METHOD AND SYSTEM FOR JOCKEY AND HORSE RECOGNITION AND TRACKING

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO OTHER APPLICATIONS

The present application claims priority to the Hong Kong Short-term Patent Application No. 22020003184.1 filed Feb. 23, 2020; the disclosure of which is incorporated herein by reference in its entirety.

FIELD OF THE INVENTION

The present invention relates generally to methods and systems for the jockey and horse recognition and tracking.

BACKGROUND

The traditional live broadcast of horse racing requires lots of operators on-site to report the positions of the horses manually. It is unable to catch up with the rapid changes of horse locations and the reporting process is error prone. In addition, it is very difficult for the novice horse racing spectators to identify the horses during the race because the jockeys and horses are tiny from afar and in wide-angle view. Also, the horse numbers on the saddle are small and illegible and frequently obscured by other horses and the railings. In wide-angle view, the silks and caps of the jockeys are the only distinct features that are visible and discernible to identify each racing horse throughout the race. However, the jockey silks, though having different patterns, are in often similar colors could look very similar in wide angle view. Another typical example is that the jockey silks look different in one angle (e.g. front view of the jockey silks) but look similar in another angle (e.g. side view of the jockey silks). Two or more jockeys may even wear the same jockey silks but just with different jockey caps. These practical challenges increase the difficulty to identify each jockey-house. Therefore, there is a need for machine-video analytic aids in the horse racing industry (e.g. the jockey clubs in Hong Kong, Japan, Dubai, UK, Australia, etc.) to process and analyze the horse racing video live feeds and captures to help addressing the challenges and provide an automated system to locate and report the positions of the horses.

In recent years, the advance in technologies such as artificial intelligence, machine learning and computer vision have proven to perform well on a wide range of problems such as object recognition and object tracking. However, each technology has its own advantages and disadvantages, and so far proven to be not quite capable in addressing the practical challenges in the horse racing, such as occlusion, similar jockey silks, identical jockey silks but different caps, etc. In a number of researches, pioneer works related to horse recognition have utilized the horses' face, iris and periocular to identify the horses or examined equine body to understand the expression or behavior of the horses. However, the horses in the images used in these researches are closeups, thus cannot be applied in the real-life horse racing scenarios because the observant position is far from the subjects and the subjects are all too tiny in wide angle view.

Consequently, there is a need in the art for a comprehensive and robust solution for accurate and real-time jockey and horse recognition and tracking in view of the aforementioned practical challenges.

SUMMARY OF THE INVENTION

The present invention is not to be limited in scope by any of the following descriptions. The following examples or embodiments are presented for exemplification only.

Accordingly, an object of this invention is to provide a method of jockey and horse recognition and tracking. The method includes receiving input images or a sequence of images obtained from horse racing videos or video streams; extracting features from the images by computational methods; locating jockey and horse positions of a target horse in the images by the computational methods; deciding to accept or reject the computed jockey and horse positions according to an acceptance function; and producing the final jockey and horse positions and their associated information by an error correction algorithm.

The method includes a process of accepting or rejecting the computed jockey and horse positions based on the acceptance function in addressing the aforementioned practical challenges, comprising: the confidence level of the features; weighted sum of the features; decision tree algorithm; region of interest (ROI) overlapping algorithm; and verification algorithm to increase the robustness and accuracy while remove the false positives.

The method further includes a process of means of error correction to smooth out the noises or errors and enhance the user viewing experience: temporal smoothing algorithm; and temporal filling algorithm.

BRIEF DESCRIPTION OF THE DRAWINGS

Embodiments of the present invention are described in more detail hereinafter with reference to the drawings, in which.

DETAILED DESCRIPTION

In the following description, the methods and systems for jockey and horse recognition and tracking are set forth as preferred examples. It will be apparent to those skilled in the art that modifications, including additions and/or substitutions may be made without departing from the scope and spirit of the invention. Specific details may be omitted to avoid obscuring the invention; however, the disclosure is written to enable one skilled in the art to practice the teachings herein without undue experimentation.

Figure 1:
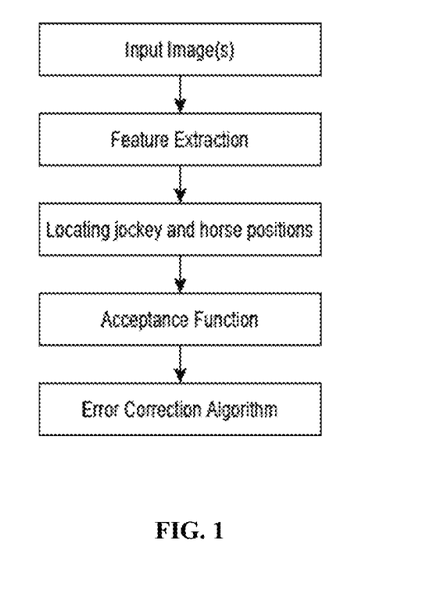
FIG. 1 depicts a flow chat of the methods and systems for jockey and horse recognition.

Referring FIG. 1. In one embodiment, the method of performing jockey and horse recognition and tracking comprises receiving one or more input images or a sequence of images obtained from horse racing one or more videos or video streams; extracting one or more features from the images by computational methods; locating jockey and horse positions of a target horse in the images by the computational methods; deciding to accept or reject the computed jockey and horse positions according to an acceptance function; and producing the final jockey and horse positions and their associated information by an error correction algorithm.

In the horse racing videos, most of the shots are taken at wide angle views so that a majority of racing horses can be captured. In wide angle views, the jockeys and horses are tiny and the horse numbers on the saddle are small and illegible and frequently obscured by other horses and the railings. The silks and caps of the jockeys are the only distinct features that are visible and discernible to identify each racing horse throughout the race.

In making the present invention, the inventors determined that the jockey silk and jockey cap are the key features that are utilized to identify the target horse by extracting the machine learning feature vectors, colors and patterns of the jockey silks and caps. Due to the maturity and high accuracy of the optical character recognition (OCR) technology, it is also determined that the horse number on the saddle is also used as an additional feature to further increase the accuracy of identifying the target horse even though the horse number on the saddle is only occasionally available. Apart from extracting the features of the jockey (silk and cap) and horse (number on the saddle) to perform the recognition tasks, the tracking and motion estimation of the jockey and horse are the indispensable functions in greatly enhancing the accuracy. Hence, the motion vectors and optical flow vectors features for the motion estimation are extracted.

Figure 2:
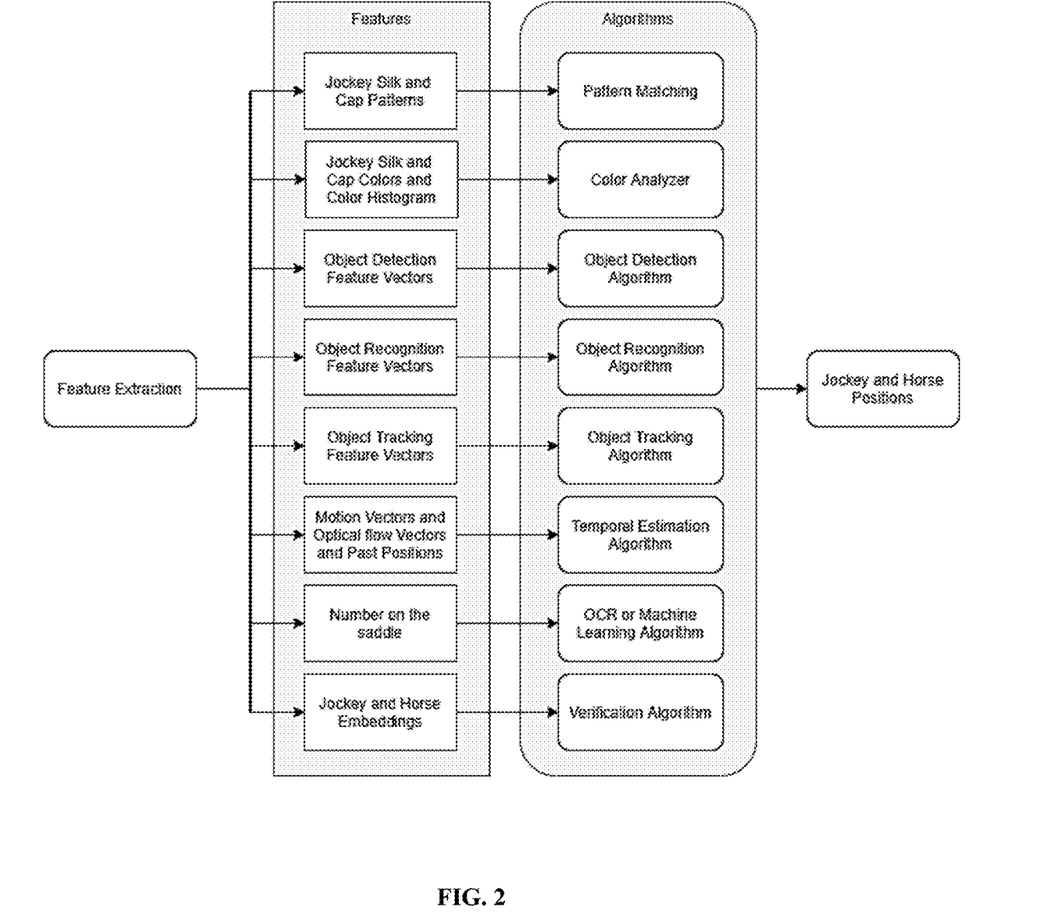
FIG. 2 depicts the feature extraction and the use of algorithms.

In order to fully utilize the features and identify the jockey and horse positions, the computational methods, different algorithms in computer vision, artificial intelligence, machine learning models and positioning algorithms to locate jockey and horse positions from multiple cameras alignment are applied. As depicted in FIG. 2, all the aforementioned features are fed into the corresponding algorithms, including object detection, object recognition, object tracking, optical flow, the space construction and verification, optical character recognition (OCR), pattern matching, color analyzer, computer vision algorithms (e.g. image or video processing, video analysis, machine/deep learning, feature extraction, object detection, object tracking, optical flow, etc.) and temporal estimation algorithms based on previous frames.

Object detection algorithm is used to locate all the horses, jockey silks, jockey caps or any numbers on the saddle. In addition, object recognition algorithm is used to identify each target horse, jockey silk, jockey cap or the actual number on the saddle. Object tracking algorithm is used to track the jockey silk and jockey cap after an initial object is provided by object detection or object recognition algorithms. Optical flow is used to estimate the motion of the jockey silk and jockey cap. Optical character recognition (traditional or machine learning method) is used to recognize all the digits in the whole image or a defined area (e.g. within the area of the saddle after the saddle detection). Pattern matching is used to find the target jockey silk and cap using the past jockey silk and cap from previous frames, e.g. histogram of oriented gradients (HOG), local binary pattern (LBP), scale invariant feature transform (SIFT) and their variants, etc. Color analyzer is used to extract the colors in the jockey silks or caps or build the color histograms to identify the target jockey silk and cap. Computer vision algorithms (e.g. OpenCV) contain useful tools for image processing, video analysis and machine learning algorithms (feature extraction, object detection, tracking, optical flow, etc.).

Space construction and verification is different from the common object recognition approach, which produces the trained jockey silks and caps embeddings as feature vectors (e.g. L2 distance in the embedding space is equivalent to the similarity of the jockey silks and caps that is similar to the idea of face recognition) and the verification algorithm is to compute the distance between the two embeddings. For the implementation, there is an enrollment process to generate the jockey silks and caps embeddings for all of the horses (in races and/or in stables) using the trained network and register these embeddings in the database. During the verification process, the embeddings of the target jockey silk and cap are extracted using the trained network and compared these embeddings against all the jockey silks and caps embeddings in the database by finding the candidate with the shortest embedding distance. The advantage of this approach is that when there is a new jockey silk and cap, they only need to be enrolled and recorded in the database (by generating the jockey silks and caps embeddings) and there is no need to re-train the machine learning model (which is required in common object recognition approach).

The temporal estimation algorithms based on previous frames include the motion estimation using the motion vectors or optical flow vectors obtained from previous frames, and the estimation of the jockey and horse position for the current frame using the correlation of the past jockey and horse positions from previous frames.

Each algorithm per se can be utilized, or a combination of few algorithms can be combined and applied in different stage to perform different tasks. For instance, objection detection or object recognition on the jockey silk and cap and optical character recognition on the horse number on the saddle can be combined with object tracking to perform jockey and horse recognition and tracking. However, when there is limited training data for a target horse (e.g. only race for few times), this might result in missed detection and yield flickering effect. There are two ways to handle the missed detection: utilize the positive results from other algorithms (e.g. optical flow) to fill in the missed detection, or estimate the current detection based on the previous positive detections (or future positive detections if it is a Video on Demand (VOD) file) in the error correction algorithm.

In machine learning network architecture, there are two streams in object detection or recognition: one-stage algorithm which combines feature extraction and object recognition; and two-stage algorithm which performs feature extraction followed by object recognition. One-stage algorithm aims to achieve high inference speed and real-time performance that is suitable for the live horse racing application while two-stage algorithm targets to provide high recognition accuracy which can be applied in the VOD file after the horse racing is completed. The use of one-stage or two-stage algorithm is selected wisely depending on the performance, accuracy and the requirement and scope of the work.

Figure 3:
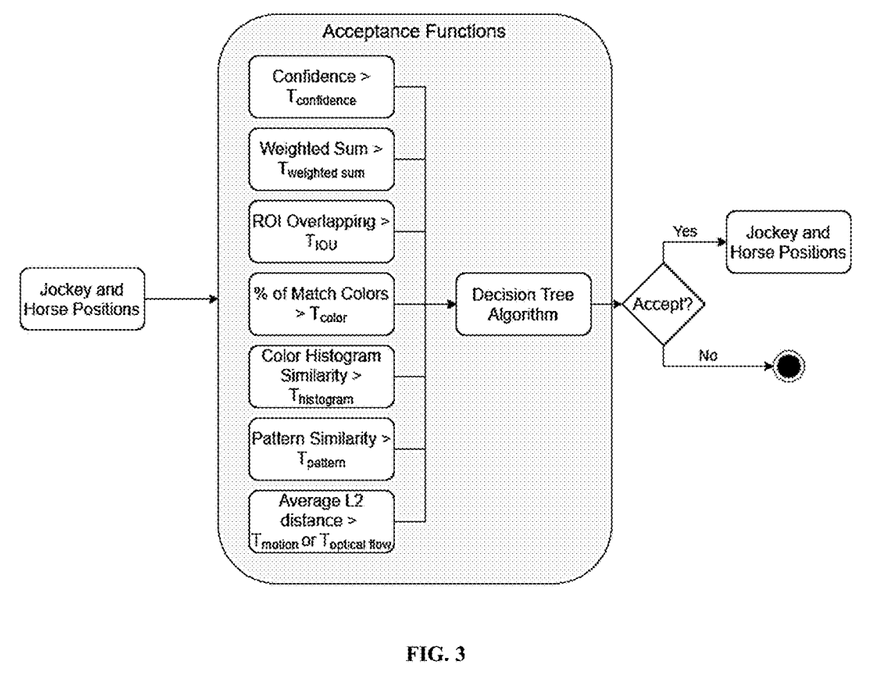
FIG. 3 depicts the acceptance functions.

Referring to FIG. 3. When the jockey and horse positions are computed, an acceptance function is proposed to accept or reject these computed positions. It is a function of the jockey silk, jockey cap, horse number on the saddle, including the machine learning feature vectors, color and pattern of jockey silks and caps, motion vectors and optical flow vectors in the region of jockey silks and caps. The acceptance function includes the confidence level of the features, weighted sum of the features, region of interest (ROI) overlapping algorithm, verification algorithm and decision tree algorithm to increase the robustness and accuracy while remove the false positives.

The confidence level of each feature needs to be greater than a threshold value $T_{feature(n)}$; otherwise the feature is not considered.

When the weighted sum of features is used, this needs to be greater than a threshold value, $T_{weighted\ sum}$. An example of the weighted sum function can be expressed as follows:

$w_1 \times$ jockey silk score $+ w_2 \times$ jockey cap score $+ w_3 \times$ horse no. score The region of interest (ROI) overlapping algorithm computes the overlapped ROI of the current jockey and horse position and the past jockey and horse positions from previous frames, which helps to further increase the confidence to accept the current computed jockey and horse positions as well as remove false positives (i.e. reject the computed jockey and horse position) because the jockey and horse follows a trajectory and their positions are very likely to overlap with the positions in previous frame when they are in the field-of-view of the cameras. The formula for calculating the overlapping region is using the intersection over union (IOU) can be expressed as follows:

$$IoU = \frac{\text{Area of Overlap}}{\text{Area of Union}}$$

And the IoU needs to be greater than a threshold value $T_{IOU}$ to accept the current jockey and horse position.

The verification algorithm computes the similarity of the features in the computed jockey and horse position in the current image against the jockey and horse positions obtained from previous frame and verify if the computed jockey and horse position is accepted or rejected, which helps to increase the confidence to accept the positions as well as remove false positives. The computation of similarity includes the color analyzer, pattern matching and comparison of motion vectors and optical flow vectors.

The color analyzer is to (1) extract all the colors in the jockey silks and caps and the number of matched colors needs to be greater than a threshold value $T_{color}$ in percentage; and (2) extract the color histogram and compare the histogram using the computer vision algorithms and the histogram similarity needs to be greater than a threshold value $T_{histogram}$.

The pattern matching is to extract the patterns using the computer vision algorithms and calculate the Euclidean distance between the patterns of the jockey silks and caps and the pattern similarity needs to be greater than a threshold value $T_{pattern}$.

The comparison of the motion vectors and optical flow vectors is using the Euclidean distance (L2) between the vectors in the region of jockey silks and caps and the average of the L2 distances needs to be greater than the corresponding threshold values $T_{motion}$ and $T_{optical\ flow}$ to accept the current jockey and horse position. The region of jockey silks and caps is provided by the object detection of the jockey silks and caps.

$$\text{Average of } L2 \text{ distance} = \frac{\sum L2 \text{ distance}}{\text{Number of vectors}}$$

The decision tree algorithm determines if the computed jockey and horse position in the current frame is accepted based on the above conditions and several other conditions. An example of the decision tree algorithm to handle the situation where there are two or more jockeys in the same race same wearing the same jockey silk but different jockey cap is that the algorithm classifies two or more identical jockey silks as the same jockey silk (e.g. similar confidence level), then the algorithm selects the highest score of the jockey caps from the jockeys with the same jockey silk and classify it as the target jockey and horse.

To handle the condition where the jockey silks having different patterns but similar colors appearing very similar in wide angle view, and the condition where the jockey silks appearing different in one angle (e.g. front view of the jockey silks) but appearing similar in another angle (e.g. side view of the jockey silks), ROI overlapping and verification algorithms are applied after the object recognition and tracking on jockey silks, caps and horse number on the saddle to increase the accuracy of identifying correct jockey silk and cap for the target horse and avoid identifying similar jockey silks and caps as false positives. The rationale behind is that even though the jockey silk and cap are recognized with uncertainty in the current frame, the current jockey silk and cap can still be confirmed and checked against the recognized results from previous frames such as overlapping portion of position markers or the very high similarity of jockey silk and cap between the current frame and previous frame.

Figure 4:
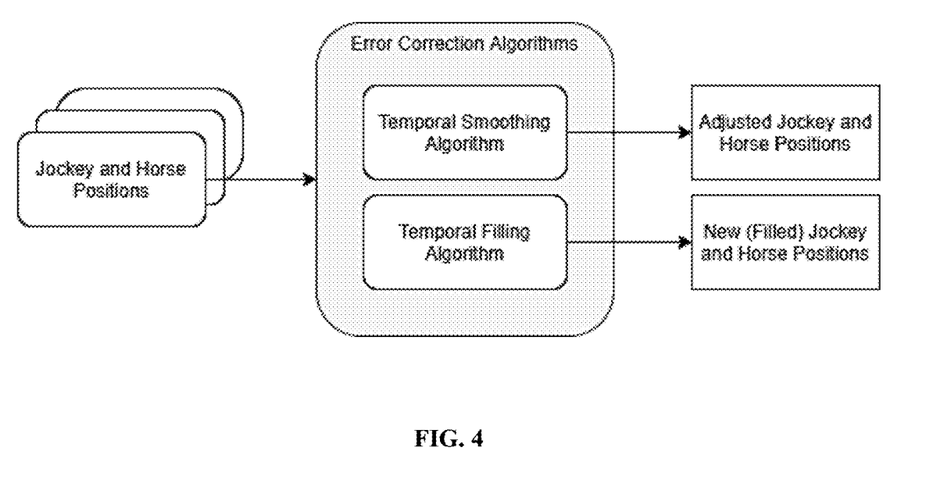
FIG. 4 depicts the error correction algorithms.

Referring to FIG. 4. When the jockey and horse positions and associated information is processed after the acceptance function, it is proposed to produce the final jockey and horse positions and their associated information (e.g. timestamp of the video frame, the race date, race number, the horse name, the brand number, detailed race information, e.g. race course, going and location, draw, etc. and horse information, e.g. country of origin, age, color, gender, etc., the coordinates of the marker, confidence level, the versions of software and machine learning model that computes the jockey and horse position) using the error correction algorithm. The reason is that the placements and sizes of the markers provided by the object recognition and tracking algorithms for each frame after the acceptance function could be inconsistent (e.g. sometimes larger or smaller, left or right shift by few pixels, etc.). The markers displayed in each frame over time could appear jumping up and down, left and right, or even enlarge and reduce. A temporal smoothing algorithm is added to adjust and smooth the inconsistent jockey and horse position markers in terms of placement and size based on past jockey and horse position markers and to avoid reduce placement jumping and size changing of the position markers generated by the object recognition and tracking algorithms.

On the other hand, missed detections occur when none of the algorithms can generate a positive jockey and horse position. If there are intermittent missed detections (e.g. a missed detection in between several consecutive positive detections). This yields a flickering effect for the jockey and horse position markers. The temporal filling algorithm is added to fill in the missed detection by estimating the current jockey and horse position based on the past jockey and horse positions (and future jockey and horse positions in the next few frames if it is a Video on Demand (VOD) file) to avoid flickering of the position markers. However, it is possible that there are continuous missed detections (e.g. not enough past races for training data) hence the temporal filling algorithm can only be applied on the occasional missed detections.

After the final jockey and horse positions are generated, the output is displayed in the computer units or display devices or used for video analytics (e.g. location, speed, etc.). There are several means of displaying the output of the final jockey and horse positions: (1) overlay the markers directly on the horse racing video; (2) an application to select which horse(s) to enable or disable the markers overlaid indirectly on the horse racing video; and (3) transmit the jockey and horse positions to other system and display them indirectly in the system. On the other hand, the final jockey and horse position can be used for video analytics. For example, the locations of the horses can be found using the coordinates of the jockey and horse positions; estimate the speed of the horses by measuring the distance in pixels it travelled over time when the frame rate of the video is known.

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated. Furthermore, specified steps can be carried out concurrently unless explicit claim language recites that they be carried out separately.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

What is claimed is:

1. A method for performing jockey and horse recognition and tracking, comprising:
   receiving one or more input images or a sequence of images obtained from horse racing videos or video streams;
   extracting one or more features from the images by computational methods, comprising one or more of algorithms in computer vision,
   artificial intelligence, machine learning models, and positioning algorithms;
   locating one or more jockey and horse positions of a target horse in the images by the computational methods;
   deciding to accept or reject the computed jockey and horse positions according to an acceptance function; and
   producing the final jockey and horse positions and their associated information by an error correction algorithm.

2. The method for performing jockey and horse recognition and tracking according to claim 1, wherein the features comprising:
   jockey silk and cap patterns;
   jockey silk and cap colors and color histogram;
   object detection feature vectors;
   object recognition feature vectors;
   object tracking feature vectors;
   motion vectors and optical flow vectors and past positions;
   number on the saddle; and
   jockey and horse embeddings.

3. The method for performing jockey and horse recognition and tracking according to claim 1, wherein the algorithms comprise object detection, object recognition, object tracking, optical flow, space construction and verification, optical character recognition (OCR), pattern matching, color analyzer, computer vision algorithms, or temporal estimation algorithms based on previous frames.

4. The method for performing jockey and horse recognition and tracking according to claim 3, wherein the space construction is the construction of jockey and horse embeddings as feature vectors, and the verification algorithm is used to compute the distance between the two embeddings.

5. The method for performing jockey and horse recognition and tracking according to claim 3, wherein the temporal estimation algorithms based on previous frames comprise the motion estimation using the motion vectors or optical flow vectors obtained from previous frames, and the estimation of the jockey and horse position for the current frame using the correlation of the past jockey and horse positions from previous frames.

6. The method for performing jockey and horse recognition and tracking according to claim 1, wherein the method of extracting features from the images and the method of locating jockey and horse positions of a target horse in the images are combined as one-stage algorithm, or on their own as two-stage algorithm.

7. The method for performing jockey and horse recognition and tracking according to claim 1, wherein the acceptance function is a function of the jockey silk, the jockey cap, the horse number on the saddle including the machine learning feature vectors, color and pattern of the jockey silks and caps, motion vectors and optical flow vectors in the region of jockey silks and caps.

8. The method for performing jockey and horse recognition and tracking according to claim 7, wherein the acceptance function comprises a confidence level of the features, a weighted sum of the features, a region of interest (ROI) overlapping algorithm, a verification algorithm, or a decision tree algorithm.

9. The method for performing jockey and horse recognition and tracking according to claim 8, wherein the confidence level of the features is greater than a threshold value $T_{feature(n)}$ and the weighted sum of the features is greater than another threshold value $T_{weighted\ sum}$, wherein a formula for obtaining the weighted sum function is as follows:

$w_1 \times$ jockey silk score $+ w_2 \times$ jockey cap score $+ w_3 \times$ horse no. score.

10. The method for performing jockey and horse recognition and tracking according to claim 8, wherein the region of interest (ROI) overlapping algorithm computes the overlapped ROI of the current jockey and horse position and the past jockey and horse positions from previous frames, which helps to further increase the confidence to accept the current computed jockey and horse positions as well as remove false positives.

11. The method for performing jockey and horse recognition and tracking according to claim 8, wherein the verification algorithm computes the similarity of the features in the computed jockey and horse position in the current image against the jockey and horse positions obtained from previous frame and verify if the computed jockey and horse position is accepted or rejected, which helps to increase the confidence to accept the positions as well as remove false positives.

12. The method for performing jockey and horse recognition and tracking according to claim 8, wherein the decision tree algorithm determines if the computed jockey and horse position in the current frame is accepted based on several conditions.

13. The method for performing jockey and horse recognition and tracking according to claim 11, wherein the computation of similarity comprises the color analyzer, pattern matching, or comparison of motion vectors and optical flow vectors.

14. The method for performing jockey and horse recognition and tracking according to claim 1, wherein an output of the final jockey and horse positions is displayed in computer units, display devices, or being used for video analytics.

15. The method for performing jockey and horse recognition and tracking according to claim 1, wherein the error correction algorithm comprises a temporal smoothing algorithm and a temporal filling algorithm to smooth out the noises or errors and enhance the user viewing experience.

16. The method for performing jockey and horse recognition and tracking according to claim 15, wherein the temporal smoothing algorithm is to adjust and smooth the current jockey and horse position markers in terms of position and size based on the past jockey and horse position markers to reduce placement jumping and size changing of the position markers.

17. The method for performing jockey and horse recognition and tracking according to claim 15, wherein the temporal filling algorithm is to fill in the missed detection by estimating the current jockey and horse position based on the past jockey and horse positions to avoid flickering of the position markers.

* * * * *